United States Patent [19]

Miya et al.

[11] 3,899,446

[45] Aug. 12, 1975

[54] PROCESS FOR PREPARING COPPER-CHROMIUM CATALYSTS

[75] Inventors: Bunji Miya; Katsuji Kasutani; Morio Matsuda; Akio Hashimoto; Shiyozo Nisigawa; Youzi Sawamoto, all of Wakayama, Japan

[73] Assignee: Kao Soap Co., Ltd., Tokyo, Japan

[22] Filed: Jan. 31, 1974

[21] Appl. No.: 438,467

[30] Foreign Application Priority Data

Feb. 2, 1973  Japan.................................. 48-13471

[52] U.S. Cl. ............................................... 252/467
[51] Int. Cl.².................. B01J 23/16; B01J 23/64; B01J 23/84
[58] Field of Search ..................................... 252/467

[56] References Cited
UNITED STATES PATENTS

| | | |
|---|---|---|
| 3,235,514 | 2/1966 | Kuwata et al....................... 252/467 |
| 3,374,184 | 3/1968 | McEvoy.............................. 252/467 |
| 3,513,109 | 5/1970 | Stiles................................ 252/467 X |
| 3,698,859 | 10/1972 | Velten............................. 252/467 X |
| 3,749,595 | 7/1973 | Foucry et al..................... 252/467 X |
| 3,767,595 | 10/1973 | Montgomery.................... 252/467 X |

*Primary Examiner*—Paul F. Shaver
*Attorney, Agent, or Firm*—Woodhams, Blanchard and Flynn

[57]   ABSTRACT

A process for preparing copper-chromium catalysts is provided, in which 0.5–3 moles of chromic acid anhydride are dissolved in water, the resulting solution is added and reacted with 1 mole of cupric oxide, 0.1–1 mole (as formaldehyde) of a reducing agent which will be converted into carbon dioxide and water by oxidation is added thereto and reacted, further 0.9–8.0 moles of ammonia are added thereto and reacted, and the resulting product is dried by evaporation and calcined to obtain the desired catalyst.

10 Claims, No Drawings

PROCESS FOR PREPARING COPPER-CHROMIUM CATALYSTS

BACKGROUND OF THE INVENTION

1. Field of the Invention

This invention relates to a process for the preparation of copper-chromium catalysts and the primary object of the present invention is to provide a process for preparing a copper-chromium catalyst which is free from by-production of harmful substances in the preparation of the catalyst.

2. Description of the Prior Art

Recently, a problem of environmental pollution has become acute with the economic development. Higher alcohols have been produced on a large commercial scale by reducing coconut oil or beef tallow or methyl esters thereof with high pressure hydrogen. Catalysts used in this process has been prepared mainly by adding a copper sulfate solution to a solution of a mixture of sodium bichromate and ammonia, subjecting the resulting precipitate to filtration, washing and drying and calcining the thus obtained dry product (Refer to, for example, Industrial and Engineering Chemistry, Vol. 26, page 878). However, according to this process, considerable amounts of chromium (VI) and copper ions are discharged during the steps of filtration and washing. Considerable labors and costs will be required for preventing the escape of chromium (VI) and copper ions into the environment.

The catalyst produced by the above process is called generally "copper chromite catalyst".

In the reexamination of many reports and patent literatures relating to copper-chromium catalysts from viewpoint of preventing environmental pollution, a few processes disclosed therein which are worthy of discussion were found. For example, in the specification of U.S. Pat. No. 2,512,653, there is disclosed a process wherein a mixture of copper acetate and chromic acid anhydride is thermally decomposed. Though the specification is silent on properties of the catalyst produced by said process, the catalyst generates acetic acid in the thermal decomposition and the catalyst is of a high cost.

In the Report of Tokyo Industrial Laboratory, Vol. 56, p. 150 (1961), there is described a process for producing a catalyst for methanol synthesis, wherein copper oxide is dissolved in a solution of chromic acid anhydride, the resulting solution is kneaded together with zinc oxide, and the mixture is molded and dried. However, the catalyst obtained by this process is for the synthesis of methanol and cannot be used for the preparation of higher alcohols. Thus, the catalyst per se has no activity as catalyst for the reduction of methyl esters of coconut oil or beef tallow with high pressure hydrogen to obtain higher alcohols. Though some activity of the catalyst can be obtained if calcination is effected after the drying, the activity thus obtained is still insufficient. Though the activity can be increased remarkably by adding ammonia thereto before or after the addition of said zinc oxide and thereafter calcining the same, the catalyst thus obtained has still serious demerits. The demerits are that the filtration of the catalyst after the use for the above ester reduction is very difficult and a large amount of chromium is dissolved in the resulting higher alcohol to change the color of the liquid into dark green.

There may be mentioned another process wherein a mixture of copper nitrate and chromium nitrate is subjected to a thermal decomposition. However, according to this process, harmful nitrogen oxides are evolved by the decomposition and also the starting materials are expensive.

Thus, a precipitation process with use of an aqueous solution is unsuitable generally for obtaining a copper-chromium catalyst which does not cause any environmental pollution and, therefore, the employment of a thermal decomposition process is necessary. However, it is to be noted that a harmful gas such as nitrogen oxides should not be evolved by the thermal decomposition process and many other requirements should be satisfied by the catalyst. The requirements are as follows:

The resulting catalyst has a high activity.
Preparation of the catalyst is easy.
The catalyst has an excellent filtration property.
The catalyst is of a low cost.
A higher alcohol prepared by using the catalyst is not colored due to the catalyst.
A high pressure apparatus is not corroded during the preparation of the higher alcohol.

SUMMARY OF THE INVENTION

After intensive investigations for the purpose of finding a copper-chromium catalyst which causes no environmental pollution and satisfies the above requirements, we have found the following facts.

Copper compounds usable in the thermal decomposition process are limited to cupric oxide, cuprous oxide, basic copper carbonate, copper hydroxide, copper nitrate and organocopper salts. However, among them, a copper compound which can be actually used in view of the gases to be evolved in the decomposition and its cost is only cupric oxide. The cupric oxide starting material must have as small as possible amount of chlorides. In this respect, cupric oxide obtained from inexpensive copper dusts is preferred rather than the one produced by a conventional process. Among the copper compounds listed above, cuprous oxide cannot be used, since it does not give a catalyst having a substantial activity, as shown in the Comparative Example given below. The basic copper carbonate and copper hydroxide give highly active catalysts, though they are expensive. However, both compounds cannot be used for the purpose of preparing such catalysts actually, since alcohols prepared in the presence of these catalysts are colored, as will be described below.

As chromium source in the thermal decomposition process, there may be considered chromic acid anhydride, ammonium bichromate and chromium nitrate. However, from the viewpoints of the gases to be evolved, activities of the catalysts to be obtained and cost, the chromium source that can be practically used is only chromic acid anhydride.

We have found that, for attaining the object of the present invention, the copper source is limited to cupric oxide and the chromium source is limited to chromic acid anhydride. After subsequent, intensive investigations, we have found further that the object of the present invention can be attained by the process which will be described below. The present invention has been accomplished on the basis of this finding.

The process for preparing copper-chromium catalyst of the present invention is characterized in that chromic acid anhydride is dissolved in water, the solution is added and reacted with cupric oxide, then a reducing agent such as formaldehyde which will be changed into carbon dioxide and water by oxidation is added thereto and reacted, further ammonia is added thereto and reacted, the resulting reaction product is dried by evaporation and finally the product is calcined at a high temperature to obtain the desired catalyst.

The reason why formaldehyde is added to the reaction system in the process of the present invention is to reduce chromium (VI) of the unreacted chromic acid anhydride to chromium (III) with formaldehyde beforehand for preventing the vigorous decomposition of ammonium chromate with emitting sparks in the calcination, which ammonium chromate will be formed from the unreacted chromic acid anhydride remaining in the reaction mixture. Accordingly, reducing agents other than formaldehyde which will be changed into carbon dioxide and water by oxidation, such as formic acid and oxalic acid, may also be used. However, formaldehyde and methanol are most preferred in view of their reactivities and costs. In the case of using basic copper carbonate, though no firing is not observed even in the absence of such reducing agent, this starting compound is expensive as described above, and, in addition, the resulting alcohols will be colored by chromium. The alcohols are also colored in the case of using copper hydroxide. Though such firing in the calcination step can be prevented by the addition of a large amount of zinc compounds, the problems of filtration and coloring as described above will occur.

In the process of the present invention, the use of ammonia is indispensable, since ammonia increases the activity of the catalyst to be obtained. Ammonia may be used in either a gaseous form or an aqeuous solution form. The form of ammonia gives no substantial influence upon the activity of the copper-chromium catalyst of the present invention and both forms give substantially the same catalyst activities. Further, the catalyst activity is substantially equivalent or somewhat superior to that of a conventional copper chromite catalyst. Ammonia may be replaced with ammonium hydrogen carbonate or ammonium carbonate. In this case, too, the catalyst activities are equivalent to that of the case of using ammonia. However, ammonium hydrogen carbonate and ammonium carbonate are inferior to ammonia due to their higher costs and their remarkable foaming during the reaction.

As for the proportion of the starting materials in the process of the present invention, per 1 mole of cupric oxide, chromic acid anhydride is used in a quantity of 0.5–3.0 moles, preferably 1.0–2.0 moles; formaldehyde is used in a quantity of 0.1–1.0 mole (in case of another reducing agent which will be changed into carbon dioxide and water by oxidation, a quantity corresponding to 0.1–1.0 mole of formaldehyde), preferably 0.2–0.7 mole; ammonia is used in a quantity of 0.9–8.0 moles, preferably 1.0–4.0 moles. The amount of water to be used for dissolving chromic acid anhydride is preferably 50–500 g, more preferably 60–300 g per 100 g of chromic acid. If an excess water is used, a long period of time will be required for the drying of the product. If the amount of water is too small, on the other hand, chromic acid anhydride cannot be dissolved completely. As for the reaction temperature, the three reaction steps constituting the process of the present invention can be performed at any temperature in the range of from the room temperature to the boiling point of the reaction mixture. The reactions are carried out preferably at a temperature of 30°–90°C. Reaction time in each step is preferably from 10 minutes to 2 hours, more preferably 30–60 minutes. Cupric oxide, formaldehyde and ammonia in respective steps are preferably added slowly. Particularly, formaldehyde should be added carefully, since a vigorous exothermic reaction is caused. When ammonia is added to the reaction system, a large amount of precipitates is formed to change the reaction mixture into a slurry and, therefore, a means for improving the contact with ammonia is necessary. If gaseous ammonia is used the thickness of the slurry can be controlled with the amount of water used for dissolving chromic acid anhydride. If aqueous ammonia is used, the thickness of the slurry also varies depending upon the amount of the aqueous solution. After the completion of the addition of ammonia, the reaction mixture is dried by evaporation. The evaporation is quite easy and the evaporation residue does not become sticky.

In the evaporation to dryness, an excess ammonia will be volatilized in case a large amount of ammonia is used. Accordingly, ammonia should be used in a minimum amount. Ammonia thus volatilized is collected by a suitable means and reused. It is desirable to use the thus collected ammonia in the form of ammonium sulfate for other suitable purposes. The dry product thus obtained is then pulverized. The pulverization also is very easy. It is possible to omit the pulverization step if a suitable measure is taken in the step of evaporation-to-dryness or the subsequent step of calcination.

Temperature and time of the calcination in the present invention are preferably 250°–650°C and from 10 minutes to 3 hours, respectively, and more preferably, 350°–550°C and from 30 minutes to 2 hours, respectively.

According to the present invention, ammonia will be converted to nitrogen by the calcination without evolution of harmful nitrogen oxides. Thus, no trouble of environmental pollution will be caused. Formaldehyde is converted substantially completely to carbon dioxide unless it is used in a large excess amount. Therefore, no problem is posed in the drying or calcination.

By using two reaction tanks in the process of the present invention, the washing of the reaction tanks may be omitted. Namely, if the first reaction tank is used till the addition of formaldehyde and the second reaction tank is used for the addition of ammonia, the catalyst prepared subsequently will have uniform properties such as activity, etc. By such a means, the escape of pollutants into the environment can be prevented.

In addition to the above described merit of causing no environmental pollution, the catalyst prepared by the process of the present invention has many other merits such as high activity, easy preparation, excellent filtration property and low cost.

The catalyst according to the present invention is free from the tendency of corroding the high pressure device used for the preparation of higher alcohols. Thus, the catalyst according to the present invention is quite suitable for the industrial use.

The present invention will be further described by reference to the following illustrative Examples.

EXAMPLE 1

150 Grams (1.5 moles) of chromic acid anhydride were dissolved in water. The resulting solution was added with 79.5 g (1.0 mole) of cupric oxide and the reaction was carried out at 70°C for 1 hour. After the completion of the reaction, the product contained a small amount of precipitates. 32.4 Grams (0.4 mole as pure formaldehyde) of 37% aqueous formaldehyde solution were added dropwise thereto over 30 minutes. During the addition, the reaction mixture was cooled to keep the liquid temperature at around 70°C. Then, 75.9 g (1.25 mole as pure ammonia) of 28% aqueous ammonia were added thereto over about 20 minutes. The reaction was continued for further 40 minutes. The reaction product was dried at 120°C, pulverized and calcined at 450°C for 1 hour. 7.5 Grams of the catalyst thus obtained were added to 150 g of coconut oil fatty acid methyl ester and the reaction was carried out at 275°C under a hydrogen pressure of 150 Kg/cm$^2$. During the reaction, hydrogen was replaced with fresh hydrogen at intervals of 30 minutes for removing methanol formed by the reaction. A small quantity of the sample was taken out at proper intervals to determine its saponification value, hydroxyl value and iodine value. Separately, the reaction and analysis were effected in the same manner but by using a conventional, so-called copper chromite catalyst. After the reaction times of 30, 90, 150 and 180 minutes, the former exhibited saponification values of 206, 75, 9.2 and 7.7, respectively, and the latter exhibited the values of 214, 61, 13.3 and 7.7, respectively. Thus, the reactivities of these two catalysts are equivalent. Further, after 180 minutes, the hydroxyl values were 255 in both cases and the iodine values were 0.08 in the former and 0.06 in the latter. Both catalysts gave colorless, transparent higher alcohols. Filtration velocities in both cases were compared with each other to reveal that the velocity was 24 cc./min. with the copper-chromium catalyst of the present invention, while the velocity was 19 cc./min. with the conventional copper chromite catalyst. Thus, it was found that the filtration of the catalyst of the present invention is easier.

EXAMPLE 2

A catalyst was prepared in the same manner as in Example 1 except that gaseous ammonia was used in place of 28% aqueous ammonia used in Example 1. In this case of using gaseous ammonia, the drying step was shortened. The saponification value after 90 minutes of the ester hydrogenation test under the same conditions as in Example 1 was 42, which was superior to the activity of copper chromite catalyst.

In the preparation of the catalyst in this Example, the viscosity of the reacting solution at the time of the addition of ammonia was high and, therefore, a kneader was required.

EXAMPLE 3

A catalyst was prepared under the same conditions as in Example 1 except that two reactors were used, one reactor being used till the addition of formaldehyde and the other reactor being used for the addition of ammonia. The same preparation reactions were repeated five times without the washing of the reactors each time, the reaction product being left in a small quantity on the wall of the device. The catalyst obtained in each case had utterly the same properties.

EXAMPLE 4

A catalyst was prepared in the same manner as in Example 1 except that formaldehyde used in Example 1 was replaced with 16 g. (0.5 mole) of methanol and that methanol was added dropwise to the reaction system at 90°C over 30 minutes and the reaction was continued for 1.5 hours. In the same ester hydrogenation test as in Example 1, the saponification value after 90 minutes was 36.

COMPARATIVE EXAMPLE 1

150 Grams (1.0 mole) of chromic acid anhydride were dissolved in 150 g of water. The resulting solution was added with 40 g (0.5 mole) of cuprous oxide to effect the reaction at 70°C for 1 hour. Thereafter, the reaction mixture was cooled to room temperature. The mixture was kneaded together with 144 g (3.0 moles) of zinc oxide for 2 hours, dried at 120°C, pulverized and calcined at 450°C for 1 hour.

100 Grams of coconut oil fatty acid methyl ester were subjected to a reduction reaction in the presence of 5 g of a catalyst under a hydrogen pressure of 120 Kg/cm$^2$ at a temperature of 175°C. From a saponification value after 60 minutes of the reaction and a saponification value of the starting material, the reaction velocity constant was calculated, assuming that the reaction is a first-order reaction. The constant in the case of using the catalyst of Example 1 of the present invention was 0.009/min., while the constant in the case of using the catalyst obtained in Comparative Example was 0.0028/min.

COMPARATIVE EXAMPLE 2 a. 63.5 Grams (1.0 mole) as copper of basic copper carbonate were added to 243 g (4.0 moles of pure ammonia) of 28% aqueous ammonia and the whole was kept at 60°C. The mixture was then added with an aqueous solution of 100 g (1.0 mole) of chromic acid anhydride in 60 g of water and the reaction was carried out at 60°C for 1 hour. The product was dried at 100°C and then calcined at 450°C for 1 hour. During the calcination, no firing was recognized. A hydrogenation test was performed under the same conditions as in Example 1. After 90 minutes of the reaction, the saponification value of the reaction mixture was reduced already to 11.3, which suggests a high catalyst activity. However, the resulting alcohol was dark green and the chromium content of the alcohol was 160 ppm.

b. A catalyst was prepared in the same manner as in the above (a), except that basic copper carbonate was added to chromic acid anhydride and then ammonia was added thereto. After 90 minutes of the reaction in the presence of the thus obtained catalyst, the saponification value was 51 and the resulting alcohol was dark green.

c. The procedure of the above (a) was repeated except that 4.0 moles of ammonia were replaced with a mixture of 2.0 moles of ammonium hydrogen carbonate and 2.0 moles of ammonia. The saponification value after 90 minutes was 37. The resulting alcohol was dark green.

All of the three catalysts of (a), (b) and (c) agglomerated after the completion of the hydrogenation. This suggests a danger of clogging of the pipes and valves when used in industrial, continuous plants.

The embodiments of the invention in which an exclusive property or privilege is claimed are defined as follows:

1. A process for preparing a copper-chromium catalyst, which comprises dissolving 0.5 to 3 moles of chromic acid anhydride in water, adding 1 mole of cupric oxide to the obtained aqueous solution and effecting the reaction of said cupric oxide with said chromic acid anhydride; adding to the reaction mixture a reducing agent selected from the group consisting of formaldehyde, methanol, formic acid and oxalic acid, said reducing agent being transformed into carbon dioxide and water by oxidation, the amount of reducing agent added being such that its reducing effect corresponds to the reducing effect of from 0.1 to 1 mole of formaldehyde, and effecting the reduction of chromium (VI) of the unreacted chromic acid anhydride to chromium (III); further adding 0.9 to 8.0 moles of ammonia to the reaction mixture and effecting its reaction with the reaction mixture; drying the resulting mixture by evaporation and calcining the dried mixture to obtain the catalyst product.

2. The process according to claim 1, wherein, per 1 mole of cupric oxide, chromic acid anhydride is used in an amount of 1.0 to 2.0 moles, said reducing agent is used in an amount such that its reducing effect corresponds to the reducing effect of from 0.2 to 0.7 mole of formaldehyde and ammonia is used in an amount of 1.0 to 4.0 moles.

3. The process according to claim 1, wherein the amount of water used for dissolving said chromic acid anhydride is 50 to 500 g per 100 g of chromic acid.

4. The process according to claim 3, wherein the amount of water is 60 to 300 g per 100 g of chromic acid.

5. The process according to claim 1, wherein the reactions are carried out at a temperature of 30° to 90°C.

6. The process according to claim 5, wherein the reaction time in each step is from 10 minutes to 2 hours.

7. The process according to claim 6, wherein the reaction time in each step is from 30 to 60 minutes.

8. The process according to claim 1, wherein the temperature and time of the calcination is 250° to 650°C and from 10 minutes to 3 hours.

9. The process according to claim 8, wherein the temperature and time of the calcination is 350° to 550°C and from 30 minutes to 2 hours.

10. The process as claimed in claim 1, wherein two reaction tanks are used, one tank being used through the addition of the reducing agent and the second tank being used for the addition of ammonia, and the washing of the reaction tanks is omitted to prevent the escape of pollutants.

* * * * *